United States Patent [19]

Adams

[11] Patent Number: 5,402,974
[45] Date of Patent: Apr. 4, 1995

[54] SELF-CLOSING HOLDER
[75] Inventor: William E. Adams, Portersville, Pa.
[73] Assignee: Adams Mfg. Corp., Portersville, Pa.
[21] Appl. No.: 75,378
[22] Filed: Jun. 14, 1993
[51] Int. Cl.⁶ .............................................. A45D 42/14
[52] U.S. Cl. ................................. 248/205.5; 268/362
[58] Field of Search ............... 248/205.5, 205.6, 205.7, 248/205.8, 205.9, 206.1, 206.2, 206.3, 206.4, 309.3, 362, 363, 383

[56] References Cited
U.S. PATENT DOCUMENTS

| Re. 21,391 | 3/1940 | Holden . | |
|---|---|---|---|
| D. 302,107 | 7/1989 | Adams . | |
| D. 327,215 | 6/1992 | Pestone . | |
| 1,532,308 | 4/1925 | Downing | 248/205.5 |
| 1,669,838 | 5/1928 | Peterson . | |
| 2,131,224 | 9/1938 | Kaack | 248/206.1 |
| 2,131,687 | 9/1938 | Kaplan . | |
| 2,278,075 | 3/1942 | Hecht | 248/205.5 |
| 2,467,251 | 4/1949 | Bowman | 248/205.5 |
| 2,516,311 | 7/1950 | Ganz | 248/206.3 |
| 2,908,519 | 10/1959 | Holden | 248/206.3 X |
| 4,110,078 | 5/1992 | Gary | 248/206.2 |
| 4,588,153 | 5/1986 | Boston et al. | 248/74.2 |
| 4,813,640 | 3/1989 | Perentin | 248/205.8 |
| 5,000,637 | 3/1991 | Adams | 411/339 |
| 5,039,045 | 8/1991 | Adams et al. | 248/206.2 |
| 5,176,346 | 1/1993 | Liu | 248/206.1 |

FOREIGN PATENT DOCUMENTS
0228762 2/1925 United Kingdom ............. 248/205.2

Primary Examiner—Ramon O. Ramirez
Attorney, Agent, or Firm—Buchanan Ingersoll; Lynn J. Alstadt

[57] ABSTRACT

A self-closing holder made of molded, flexible material for supporting at least one object such as a wire on a smooth, nonporous receiving surface. The holder has a concavo-convex suction cup portion having a concave inner surface that engages with the receiving surface, and a convex outer surface. A cylindrical holding portion is integral with and extends outwardly from the convex cup surface. The holding portion is formed of at least one pair of legs, each pair of legs being separated by a slit opening to an exposed end of the holding portion for receiving a thin, lightweight member such as a cord, wire or hook. An annular shoulder is disposed on the cup portion convex surface. The shoulder has an inner diameter that is concentric with and connected to the cylindrical holding portion. When the cup portion is not mounted on a receiving surface, the legs are sufficiently spaced to allow insertion of at least a portion of the object into the slit. As the cup portion is mounted on the receiving surface, the shoulder is moved by the cup portion, and the shoulder in turn moves the legs toward one another such that the legs hold the object.

15 Claims, 3 Drawing Sheets

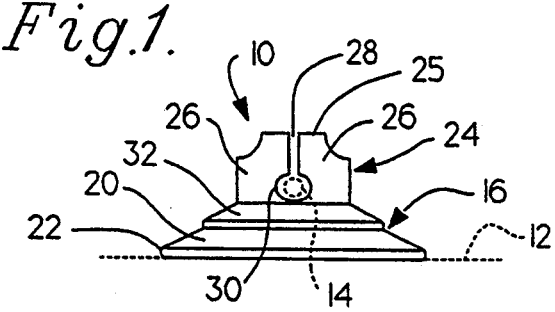
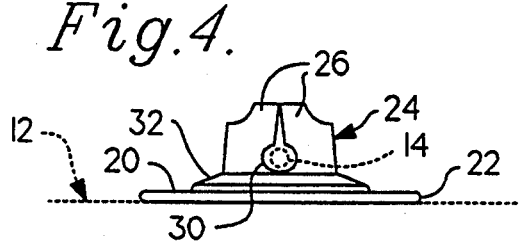
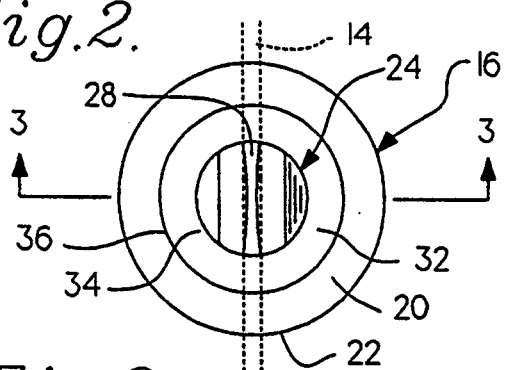
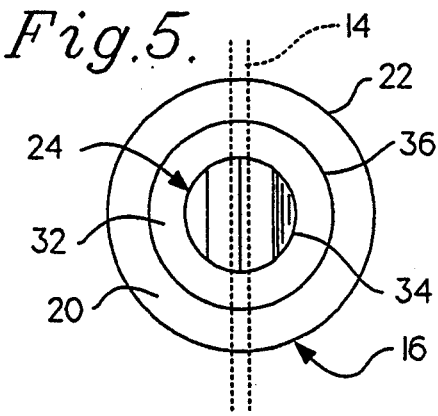
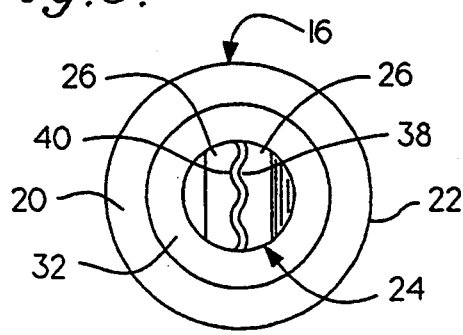
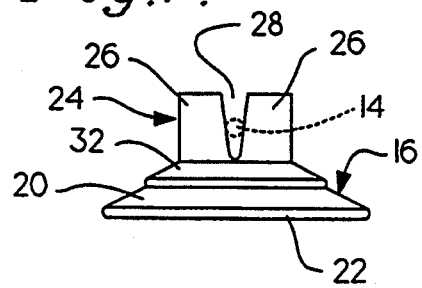
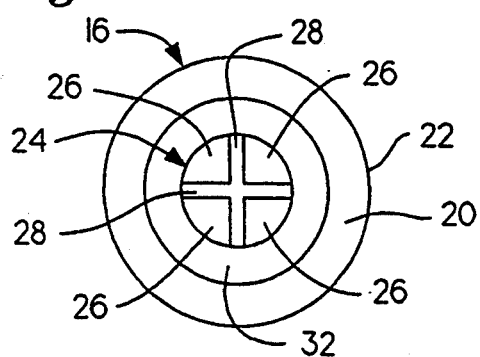
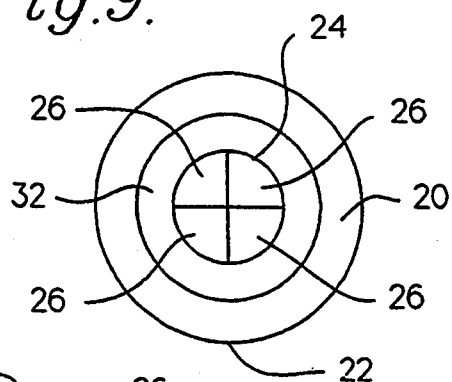
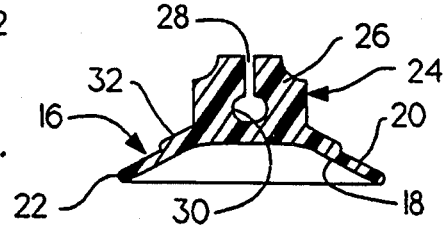

SELF-CLOSING HOLDER

BACKGROUND OF THE INVENTION

1. Field of the Invention

This invention pertains to the nonpermanent mounting of lightweight signs, ornaments, wiring and the like, to nonporous, smooth surfaces such as glass, metal, plastic, tile and the like.

2. Description of the Prior Art

Many methods are known for mounting lightweight signs, ornaments, wiring and electrical cords, particularly Christmas lighting, to windows. Adhesive tape has been one such method used. However, tape can become ineffective as moisture tends to reduce the effectiveness of the tape's adhesive. Furthermore, some of the adhesive may remain on the surface after removal of the tape. In any event, adhesive tapes are non-reuseable.

More permanent methods of hanging Christmas lighting involve affixing hooks into the structure surrounding the windows. Such hooks require the drilling or screwing of anchors or screw-like portions of the hooks into the structure. Therefore, these hooks must either be left in place permanently or be removed leaving permanent and unsightly holes in the structure surrounding the windows. Similarly, thumbtacks are a common means of affixing signs to walls. Thumbtacks also have the drawback of leaving permanent and unsightly holes in the surface.

Suction cups have provided a reuseable, inexpensive and nondestructive means of hanging items such as electrical lighting. For example, U.S. Pat. No. 4,588,153 to Boston et al. discloses a wire holder having a suction cup portion and an integral wire mount portion having flexible legs defining transverse slits for receiving wires therein. In the bottom of the slit lies a recess equal in diameter to the wire to receive the wire after it has been pushed through the slit. The slit has a width less than the diameter of the wire and thus the wire is inserted into the recess by spreading the wire mount to increase the width of the slit and is held in the recess by the slit returning to its normal width. Although returning to a normal width, the slits of the Boston et al. reference do not close when the cup portion is affixed to a surface. Thus, the wire holder of Boston et al. relies on the resiliency of the flexible legs to hold the wire. However, upon repeated use or upon overstretching while inserting the wire, the ability of the legs to return to their normal position may be reduced. If the legs do not fully return to their original position, the slits will be wider than is necessary to hold the wire. In that event, the Christmas lighting may fall out of the Boston et al. wire holder.

The current commercial embodiment of the Boston et al. product has a slit of about 2 mm in width and a recess of 4 mm in diameter which is the approximate diameter of the most popular Christmas light cords. Because the slit never closes, this product does not securely hold wires of less than 2 mm in diameter. Bell wire, picture hanging wire and other commonly used wires are less than 2 mm in diameter.

SUMMARY OF THE INVENTION

I provide a self-closing holder made of molded, flexible material for supporting at least one object such as a sign, ring, cord, wire, ornament or hanger on a smooth, nonporous receiving surface. When a hanger, ring or wire are held in the self-closing holder, they may in turn hold another lightweight object such as a cord, wire or ornament. The holder has a suction cup portion and an integral neck which functions as a holding portion. The suction cup portion is generally concavo-convex in shape, having a concave inner surface and a convex outer surface facing opposite to the inner surface. The inner surface engages with and is affixed to the smooth, nonporous receiving surface.

The neck may be generally cylindrical and is integral with and extends outwardly from the cup portion convex surface. The neck is formed of at least one pair of legs, each pair of legs being separated by a slit opening to an exposed end of the holding portion. Thus, at least one slit is provided on the exposed end of the holding portion. Multiple slits may be provided that either intersect one another or that do not intersect one another. The slits are preferably sized and configured for receiving any thin, lightweight member such as a cord or sign or portion of an ornament or hook.

An annular shoulder is disposed on the cup portion convex surface. The shoulder having an inner diameter that is concentric with and connected to the outer diameter of the cylindrical neck. When the cup portion is not in engagement with the receiving surface, the legs in an open position. In the open position, the legs are sufficiently spaced to allow insertion of the object into the slit. When the cup portion is engaged to the receiving surface, the shoulder is moved by the cup portion, and the shoulder then moves the legs toward one another into a closed position. In the closed position, the legs secure the object therein.

The legs may secure the object simply by gripping the object as opposed legs are drawn toward one another. However, in a preferred embodiment, a recess is provided at the bottom of each slit. The recess has a width that is wider than that of the slit and is preferably wider than the diameter of any wire, cord or portion of a hanger or ornament provided therein. In this embodiment, when the suction cup portion is engaged to the receiving surface, opposed legs are drawn into contact with one another in the closed position, so that the object is securely retained within the recess. The recess may be of any configuration but is preferably cylindrical.

In an alternative embodiment, the mating surface of each leg is provided with teeth and grooves to give the legs a serrated or irregular surface. Opposing teeth and grooves provide increased gripping whether the object is held in a recess or is held directly by the legs. Preferably, the teeth of one leg mate with the grooves of an opposed leg when the legs are in the closed position. Additionally, a separate piece of material may be inserted and adhered within the slit. The insert material would border the slit and would preferably be fashioned of a material that is harder and less pliant than the remainder of the holder.

Other objects and advantages of the invention will become apparent from a description of certain present preferred embodiments thereof shown in the drawings.

BRIEF DESCRIPTION OF THE DRAWINGS

FIG. 1 is a side elevational view of the first preferred holder in the open position.

FIG. 2 is a top plan view of the first preferred holder in the open position.

FIG. 3 is a sectional view taken along line 3—3 of FIG. 2.

FIG. 4 is a side elevational view of the first preferred holder in the closed position.

FIG. 5 is a top plan view of the first preferred holder in the closed position.

FIG. 6 is a top plan view of a second preferred holder.

FIG. 7 is a side elevational view of a third preferred holder.

FIG. 8 is a top plan view of a fourth preferred holder in the open position.

FIG. 9 is a top plan view of the fourth preferred holder in the closed position.

DESCRIPTION OF THE PREFERRED EMBODIMENT

Figure 10:
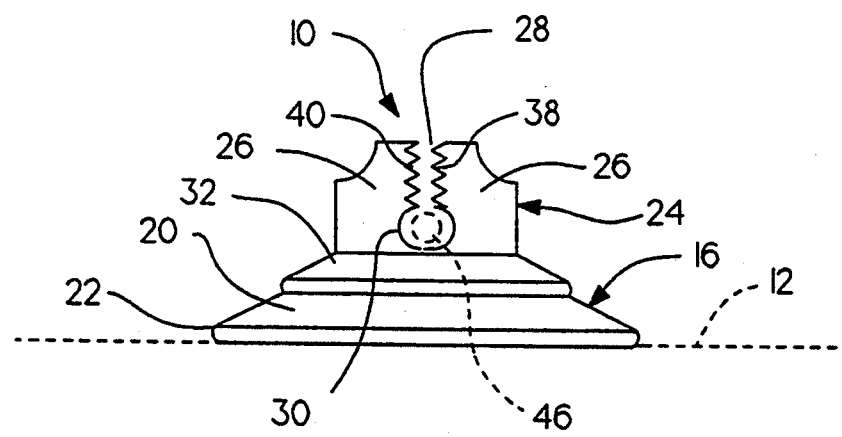
FIG. 10 is a side elevational view of a fifth preferred holder.

Referring first to FIGS. 1, 2 and 3 a self-closing holder 10 is shown that is made of a flexible, resilient material. The holder 10 has a generally concavo-convex shaped suction cup portion 16 and an integral, generally cylindrical holding portion 24. The suction cup portion 16 has a concave inner surface 18 for engagement with and affixation to a smooth, nonporous receiving surface 12 (shown in dotted line in FIG. 1), such as glass, metal, plastic, tile or Formica TM. A convex outer surface 20 faces opposite to the inner surface 18. The suction cup portion 16 terminates in a generally circular distal edge 22. The holder 10 is formed of any suitable resilient plastic or rubber, preferably polyvinyl chloride. The holder is preferably molded. The material selected for the holder 10 should have a limited flexibility to achieve the action of a suction cup resulting from an applied pressure which forces air out of the concavity thereof by negative pressure. The material selected for the holder 10 should also be sufficiently rigid to retain a thin, lightweight object 14 within its structure.

Extending outwardly from the cup portion outer surface 20 is a generally cylindrical neck which functions as the holding portion 24. The holding portion 24 is formed of at lease one pair of legs 26. Each pair of legs 26 is separated by a slit 28 which opens at an exposed end 25 of the holding portion 24 extending opposite to the cup portion 16. The slit 28 is designed to receive a thin, lightweight object 14 such as a sign, a wire or a cord (shown in dotted line in FIG. 2).

An annular shoulder 32 is disposed on the outer surface 20 of the suction cup portion 16. It is understood that the term "annular" means generally annular and that the shoulder 32 may have a somewhat irregular shape. Although the shoulder 32 is preferably continuous, the shoulder 32 may be formed in segments and be thus non-continuous it may be reduced at either or both ends of slot so that it shuts more easily. A The shoulder 32 has a selected thickness and has an inner diameter 34 that is concentric with and is connected to the holding portion 24. Preferably, the shoulder 32 has an outer diameter 36 that is less than a diameter of the circular distal edge 22 of the suction cup portion 16. Thus, the shoulder 32 preferably does not extend over the entire outer surface 20 of the suction cup portion 16. The annular shoulder 32 preferably does not cover the entire outer surface 20 of the suction cup portion 16 so that the suction cup portion 16 may more readily conform to the receiving surface 12, and thus provide greater adhesion of the suction cup portion 16 to the receiving surface 12. The thickness of the shoulder 32 is selectable, and as the shoulder 32 is made thicker, the shoulder 32 extends farther up the holding portion 24. Generally, as the shoulder 32 is made thicker, the greater will be the closing action of the holder as will be described more fully below.

As can be seen best in FIGS. 1 and 2, when the cup portion 16 is not engaged to the receiving surface 12, the holder 10 is said to be in an open position in which the legs 26 are sufficiently spaced apart to allow insertion of an object 14 into the slit 28. Preferably the width of the slit 28 in the open position is slightly less than the width of the object 14 to be inserted therein. Thus, the legs 26 need to be spread only slightly to allow insertion of the object 14 into the slit 28. It is to be understood, however, that the slit 28 may be made sufficiently wide so that the object 14 fits easily within the slit 28 when the holder 10 is in the open position with little or no spreading of the legs 26 being necessary.

Referring next to FIGS. 4 and 5, when the cup portion 16 of the holder 10 is engaged to the receiving surface 12, the shoulder 32 is pushed by the cup portion outer surface 20 against the legs 26. Thus, the legs 26 are moved toward one another and are moved into a closed position in which the object 14 is secured therein. Once the legs 26 have been moved toward one another so as to be in a closed position, a small gap may exist between the legs. However, that gap should be small enough so that the object 14 is unable to easily be moved out of slit 28.

It is preferred that a recess 30 is provided at the bottom of the slit 28. The recess 30 has a width sufficient to contain the object 14. Thus, once the object 14 is inserted into the recess 30, the object 14 will not prevent the legs 26 from moving to a closed position. In the closed position, the legs 26 have moved toward one another holding the object 14 securely in the recess 30.

Referring next to FIG. 6, a second preferred holder is shown in which a portion of the legs 26 bordering the slit 28 are serrated so as to have teeth 38 and grooves 40 placed thereon. As can be seen best in FIG. 6, it is preferred that the teeth 38 of one leg 26 face a groove 40 of an opposite leg 26 so that when the holder is in a closed position, the serrated edges of the legs 26 will be in mating contact with one another to further secure the legs 26 in the closed position. It is understood that the teeth 38 may be either rounded or jagged. It is further understood that the teeth 38 may be provided along the length of the legs 26 (as shown in FIG. 6) or along the height of the legs 26.

Although the preferred holder has a recess 30 provided at the bottom of the slit 28, a recess 30 need not be provided, as is demonstrated in the third preferred embodiment of FIG. 7. In this embodiment, the legs 26 grip the object 14 when the holder is in the closed position. As the cup portion 16 engages the receiving surface 12, the shoulder 32 is moved by the displacement of the cup portion 16 and causes the legs 26 to move toward one another (as in the proceeding embodiments). The object 14, being held within the slit 28 between the legs 26, is gripped tighter by the legs 26 when the cup holder is engaging the receiving surface 12.

The holder embodiments discussed to this point have been depicted as having only two legs 26. However, it is distinctly understood that any number of legs 26 may be provided, wherein a slit 28 lies between each pair of legs 26. FIGS. 8 and 9 show a fourth preferred holder having four legs 26. When four legs 26 are used, two slits 28 are provided. It is distinctly understood that any number of slits 28 may be provided on the holder. Also, it is distinctly understood that when more than one slit 28 is provided, the slits 28 may be intersecting or nonintersecting. Thus, any number of objects 14 may be placed parallel or at some angle to one another in the holder or a single object 14 may be placed in the holder. Once in place, the object or objects 14 are held securely as each leg 26 is moved toward an adjacent leg 26 when the holder is placed in the closed position as seen in FIG. 9. Regardless of how many legs 26 are utilized, the annular shoulder 32 ensures that all legs 26 are moved toward one another when the holder is placed in the closed position.

The legs 26 may also be serrated such that the teeth 38 and grooves 40 are provided upon the legs 26 along the depth of the slit, as shown in the fifth preferred embodiment in FIG. 10. It is preferred in this embodiment that the teeth 38 of one leg 26 face a groove 40 of an opposite leg 26, so that the serrated edges of the legs 26 mate to further secure the legs 26 when the holder is in the closed position.

Figure 11:
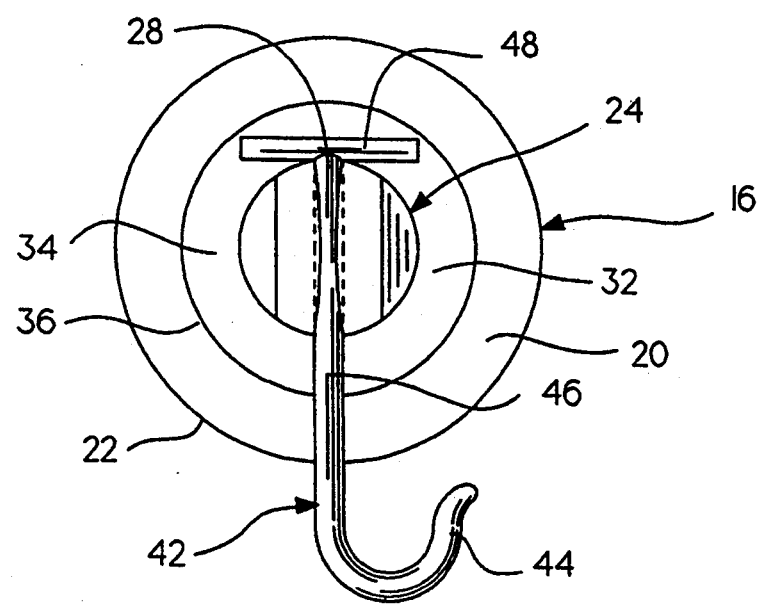
FIG. 11 is a top plan view of a sixth preferred holder.

In a sixth preferred embodiment, shown in FIG. 11, a hook 42 is inserted in the slit 28. The hook 42 could then in turn hold cords, wires, ornaments or any lightweight object on its hooked end 44. The hook 42 has a portion 46 that is sized to be received in the slit 28 or in the recess 30. The hook 42 also preferably has a portion 48 that lies in a plane perpendicular to the elongated portion 46. Portion 48 will abut the holding portion 24, keeping the hook 42 secured to the holder. It is understood that any other suitable structure such as a ring, clamp, clip or sign may be held by the holder.

Figure 12:
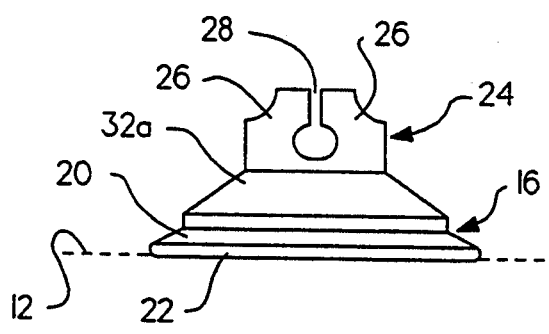
FIG. 12 is a side elevational view of a seventh preferred holder.
Figure 13:
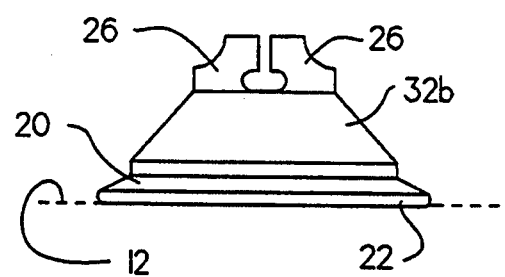
FIG. 13 is a side elevational view of an eighth preferred holder.
Figure 14:
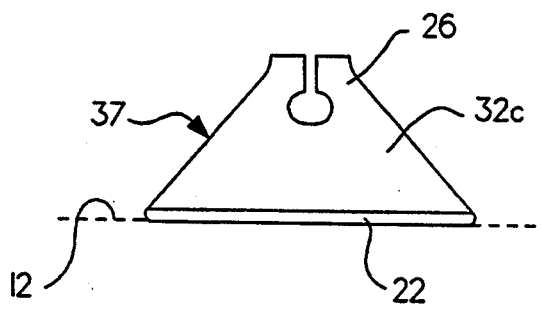
FIG. 14 is a side elevational view of a ninth preferred holder.

As discussed above, the closing action of the holder may be increased by making the shoulder larger. Progressively thicker annular shoulders 32a through 32d may be provided on the holder as is depicted in FIGS. 12 through 14. In FIG. 12, a seventh preferred holder has an annular shoulder 32a that is thicker than the annular shoulder 32 shown in the preferred embodiment of FIG. 1. Consequently, the shoulder 32a of FIG. 12 extends farther toward the distal edge 22 of the suction cup portion 16 and extends further toward the exposed end 25 of the holding portion 24 than does the shoulder 32 of FIG. 1. FIG. 13 demonstrates an eighth preferred holder having a shoulder 32b that is thicker still. By extending further toward the cup portion distal edge 22, the shoulder is moved directly by the deformation of the cup portion when the cup portion 16 is adhered to the receiving surface 12. Also, by extending the shoulder 32b further toward the holding portion exposed end 25, the shoulder applies force further from the flexure portion of each leg 26 thus increasing the lever action acting upon each leg 26.

However, providing a thick annular shoulder 32b upon the cup portion 16 near the distal edge 22 may inhibit the cup portion's ability to conform to the receiving surface 12 as discussed above. Therefore, it may be advantageous when making the shoulder 32b larger, to taper the shoulder 32b somewhat near the distal edge 22. The shoulder 32 can be tapered so that the shoulder 32c is continuous with the cup portion 16 and the holder portion 24 as shown in the ninth preferred holder of FIG. 14. Thus, an outer surface of the shoulder is continuous with the cup portion outer surface 20 and an outer surface of the holding portion 24, forming a continuous outer periphery 37.

Figure 15:
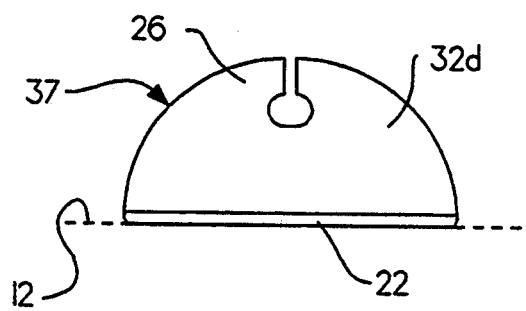
FIG. 15 is a side elevational view of a tenth preferred holder.

FIG. 15 depicts a tenth preferred holder similar to the holder of FIG. 14. The holder of FIG. 15 has a continuous outer periphery 37 but that outer periphery 37 is concave outward so that the shoulder 32d is thicker than the shoulder 32c of FIG. 14. The holders of FIGS. 12 through 15 otherwise function similarly to the holder of FIG. 1.

Figure 16:
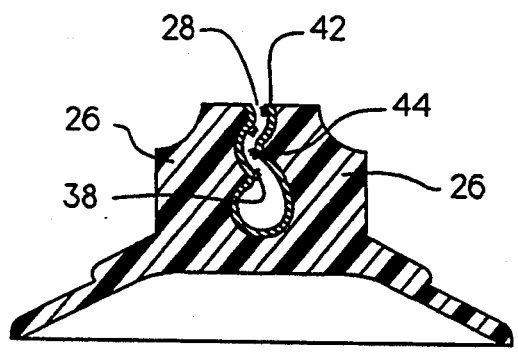
FIG. 16 is an elevational view taken in cross section of an eleventh preferred holder.

Referring next to FIG. 16, an eleventh preferred embodiment is shown. An insert 42 is inserted into the slit 28. The insert 42 is adhered to the holder material bordering the slit 28. Thus, the insert 42 borders the slit 28 in this embodiment. The insert 42 is preferably made of a material that is harder and less flexible than the remainder of the holder. The insert 42 may have an irregular surface so as to have protrusions 44 provided thereon. As can be seen in FIG. 12, the protrusions 44 are preferably placed in an alternating fashion so that the insert 42 and the slit 28 may close tightly despite the protrusions 44. The insert 42 may also have teeth provided thereon which may be provided on the protrusions 44 or on the portions of the insert 42 adjacent the protrusions 44. The insert 42 may be affixed within the slit 28 by any convenient means such as by being glued or molded therein.

Variations of the preferred embodiments may be provided. For example, the end of the holding portion 24 adjacent to the slit and extending opposite to the cup portion may be curved or beveled on at least one side of the slit so that the object 14 may more easily enter the slit 28.

In the preferred embodiments, the holding portion is shown to have a circular cross-section. However, that cross section could be oval, elliptical, square, triangular or other multiple-sided shape.

Although the preferred holder is molded as a unitary piece, the shoulder may be fabricated separately from the rest of the holder and then affixed thereto.

While certain present preferred embodiments have been shown and described, it is distinctly understood that the invention is not limited thereto but may be otherwise embodied within the scope of the following claims.

I claim:

1. A self-closing holder made of flexible material for supporting at least one object on a receiving surface, comprising:

(a) a suction cup portion being generally concave-convex in shape having a concave inner surface for engagement with and affixation to the receiving surface, and a convex outer surface facing opposite to the inner surface;

(b) a generally cylindrical holding portion being integral with and extending outwardly from the cup portion outer surface, the holding portion being formed of at least one pair of legs, each pair of legs being separated by a slit opening to an exposed end of the holding portion, each slit for receiving at least a portion of the object therein; and (c) an annular shoulder of a selected thickness disposed on the cup portion outer surface, the shoulder having an inner diameter concentric with and connected to the holding portion, wherein when the cup portion is not engaged to the receiving surface, the legs are sufficiently spaced to allow insertion of at least a portion of the object into the slit, and wherein as the cup portion is engaged to the receiving surface the legs move toward one another to a closed position.

2. The holder of claim 1 wherein the object is at least one of a sign, a ring, a cord, a wire, an ornament and a hook.

3. The holder of claim 1 wherein the annular shoulder has an outer diameter that is less than a diameter of the suction cup portion.

4. The holder of claim 1 wherein an outer surface of the annular shoulder is continuous with the cup portion outer surface and an outer surface of the holding portion forming a continuous outer periphery.

5. The holder of claim 1 wherein a gap is present between the legs when the holder is in the closed position.

6. The holder of claim t wherein the holding portion further has a recess provided at the bottom of each slit, the recess having a width greater than a width of the thin, lightweight member.

7. The holder of claim 6 wherein the recess is generally cylindrical.

8. The holder of claim 1 further comprising an insert provided within the slit, the insert being affixed to a portion of the legs bordering the slit so that the insert borders the slit, wherein at least a portion of the object is held by contact with the insert.

9. The holder of claim 8 wherein the insert is made of a material that is harder and more rigid than the cup portion and holding portion.

10. The holder of claim 1 wherein the holder is molded as a single piece.

11. The holder of claim 1 wherein the annular shoulder is fabricated separately from the cup portion and holding portion.

12. The holder of claim 1 wherein the holder is made of polyvinyl chloride.

13. The holder of claim 8 wherein a portion of the insert bordering the slit further has protrusions provided thereon.

14. A self-closing holder made of flexible material for supporting at least one object on a receiving surface, comprising:
 (a) a suction cup portion being generally concave-convex in shape having a concave inner surface for engagement with and affixation to the receiving surface, and a convex outer surface facing opposite to the inner surface;
 (b) a generally cylindrical holding portion being integral with and extending outwardly from the cup portion outer surface, the holding portion being formed of at least one pair of legs, each pair of legs being separated by a slit opening to an exposed end of the holding portion, each slit for receiving at least a portion of the object therein and wherein a portion of at least one pair of adjacent legs bordering the slit has teeth and grooves provided thereon; and
 (c) an annular shoulder of a selected thickness disposed on the cup portion outer surface, the shoulder having an inner diameter concentric with and connected to the holding portion, wherein when the cup portion is not engaged to the receiving surface, the legs are sufficiently spaced to allow insertion of at least a portion of the object into the slit and wherein as the cup portion engages the receiving surface the legs move toward one another to a closed position.

15. The holder of claim 14 wherein the teeth of one leg engage the grooves of an adjacent leg when the legs are in a closed position.

* * * * *

UNITED STATES PATENT AND TRADEMARK OFFICE
CERTIFICATE OF CORRECTION

PATENT NO. : 5,402,974
DATED : April 4, 1994
INVENTOR(S) : WILLIAM E. ADAMS

It is certified that error appears in the above-indentified patent and that said Letters Patent is hereby corrected as shown below:

Column 7, line 24, claim 6, after "claim", change "t" to --1--.

Signed and Sealed this

Eighteenth Day of July, 1995

Attest:

BRUCE LEHMAN

Attesting Officer

Commissioner of Patents and Trademarks